US010198959B2

(12) United States Patent
Drane et al.

(10) Patent No.: US 10,198,959 B2
(45) Date of Patent: Feb. 5, 2019

(54) APPARATUS FOR USE IN A LECTURE ENVIRONMENT

(71) Applicant: University of Florida Research Foundation, Incorporated, Gainesville, FL (US)

(72) Inventors: Walter E. Drane, Gainesville, FL (US); Susan J. Cardinal, Wellborn, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 602 days.

(21) Appl. No.: 14/449,261

(22) Filed: Aug. 1, 2014

(65) Prior Publication Data

US 2015/0050634 A1    Feb. 19, 2015

Related U.S. Application Data

(60) Provisional application No. 61/867,290, filed on Aug. 19, 2013.

(51) Int. Cl.
*G09B 7/073* (2006.01)

(52) U.S. Cl.
CPC .................................... *G09B 7/073* (2013.01)

(58) Field of Classification Search
USPC ................................ 434/322, 323, 350, 351
See application file for complete search history.

(56) References Cited

U.S. PATENT DOCUMENTS

| 8,326,210 | B2 | 12/2012 | Knowles |
| 2004/0191744 | A1 | 9/2004 | Guirguis |
| 2010/0218100 | A1 | 8/2010 | Simon |
| 2012/0159331 | A1 | 6/2012 | Greve |

*Primary Examiner* — Kesha Frisby
(74) *Attorney, Agent, or Firm* — Timothy H. Van Dyke; Beusse, Wolter, Sanks & Maire PLLC

(57) ABSTRACT

A system for use in a lecture environment in which a lecturer delivers a lecture to students. The lecturer can broadcast questions to the students to test their understanding of the subject matter of the lecture, and the students' answers to those question are made available to the lecturer in real time. This makes it possible for the lecturer to adapt the lecture to the students' level of understanding of the subject matter of the lecture.

7 Claims, 4 Drawing Sheets

APPARATUS FOR USE IN A LECTURE ENVIRONMENT

CROSS-REFERENCE TO RELATED APPLICATION

This application claims the benefit of U.S. Provisional Application No. 61/867,290 filed Aug. 19, 2013.

BACKGROUND OF THE INVENTION

The invention relates to apparatus for use in instruction, and more particularly relates to apparatus for use in a lecture environment in which a lecturer delivers instruction to a plurality of students. In its most immediate sense, the invention relates to apparatus for use in a lecture hall in which a lecturer delivers a lecture to a group of students, in which visual information is displayed to the students during the lecture, and in which the performance of the students is conveyed to the lecturer in real time.

A lecture class such as is given at a medical school may contain students of widely varying abilities and backgrounds. Some students may grasp the subject matter immediately, while others may consistently have difficulty understanding the concepts being taught. This range of abilities and backgrounds can pose a problem for the lecturer, especially in a large class. This is because it is difficult for the lecturer to ascertain how well the class is absorbing the subject matter of the lecture. While the lecturer may (by e.g. close examination of a particular student's behavior and demeanor) be able to guess whether that student is following the lecture, it is much more difficult for the lecturer to assess whether the class as a whole is doing so. As a result, it is difficult for the lecturer to pace the lecture appropriately. If the lecturer proceeds too rapidly, many or even most of the students will be unable to follow the lecture; if the lecturer proceeds too slowly, most of the students will be bored and the lecture will last too long.

Additionally, there are times when understanding of a particular concept is essential to proceeding further in a course of study. At such times, a lecturer needs to know whether the class as a whole understands this concept. And, even if the lecturer believes that the class is having difficulty understanding that concept, in a conventional lecture class the only options available to the lecturer are to repeat and rephrase what has been said before and to re-display visual information that was displayed already.

SUMMARY OF THE INVENTION

One object of the invention is to provide apparatus for use in a lecture environment in which a lecturer delivers instruction to a class made up of plurality of students, such delivery including presenting visual information to the students, which apparatus makes it easier for the lecturer to determine in real time how well the class understands the instruction.

Another object is to provide such apparatus that gives the lecturer the option of presenting different visual information to the students, depending on how well they understand the instruction being given.

A further object is to provide such apparatus that can record the performance of students in such a lecture environment in a database.

In accordance with the invention, apparatus for use in a lecture environment is provided. In this lecture environment, a lecturer delivers instruction to a plurality of students and presents visual information to the students. The apparatus has at least one display for displaying the visual information to the students and a computer system connected to the display, the computer system being programmed to supply visual information to the display. The apparatus also has a computer network operatively connected to the computer system and a like plurality of student response devices that are each connectable to the computer network. Each student response device is associated with a corresponding one of the students in such a manner that the student response devices and students are in one-to-one correspondence. Furthermore, each student response device is operative to receive questions from the lecturer via the computer system and the computer network and to send responses from the corresponding student to the lecturer via the computer system and the computer network.

A lecturer controller is connected to the computer network and operated by the lecturer. The lecturer controller is operative to cause the computer system to supply visual information to the display, to broadcast questions to the students via the computer system and the computer network, to receive answers from each of the students via the computer system and the computer network, and to display received answers to the lecturer.

Thus, while delivering a lecture, the lecturer can broadcast questions to the students using the lecture controller. The questions are received by the student response devices. The students answer the questions on their student response devices and the answers are received and displayed on the lecturer controller. This allows the lecturer to assess whether the class as a whole understands the lecture up to that point.

There can be one display (e.g. a large screen) that is viewed by all the students simultaneously. Alternatively, or additionally, each of the student response devices may be a portable device with a screen (such as tablet computers or smartphones) that is wirelessly connected to the computer system, each of the screens serving as an individual display for one student.

Advantageously, and in accordance with the preferred embodiment, the lecturer controller has a touch screen displaying available choices for visual information that can be presented to the students (whether on a single display or on the screens of individually-operated portable devices). Further advantageously, and likewise in accordance with the preferred embodiment, these available choices are displayed in a tree structure. This makes it easy for the lecturer to vary the visual information presented to the students depending upon their answers to questions broadcast to them (or alternatively based on pre-lecture testing). Thus, for example, the lecturer can prepare appropriate questions in advance and can also prepare visual information that can be displayed in case individual concepts are not understood. Then, at an appropriate point in the lecture, the lecturer will broadcast a question directed to a particular concept. By reviewing the answers displayed on the lecturer controller, the lecturer can assess whether the class understands that concept. If so, the lecturer can proceed to more advanced concepts and can display visual information appropriate to those. If not, the lecturer can display and explain alternate visual information and can broadcast one or more other questions to determine where misunderstandings exist and to address those misunderstandings. In other words, the preferred embodiment of the invention allows the lecturer to adapt the lecture to correspond with the class's understanding (or lack of understanding) of the subject matter taught in the lecture.

BRIEF DESCRIPTION OF THE DRAWINGS

The invention will be better understood with reference to the following illustrative and non-limiting drawings, in which.

DETAILED DESCRIPTION OF PREFERRED EMBODIMENTS

Figure 1:
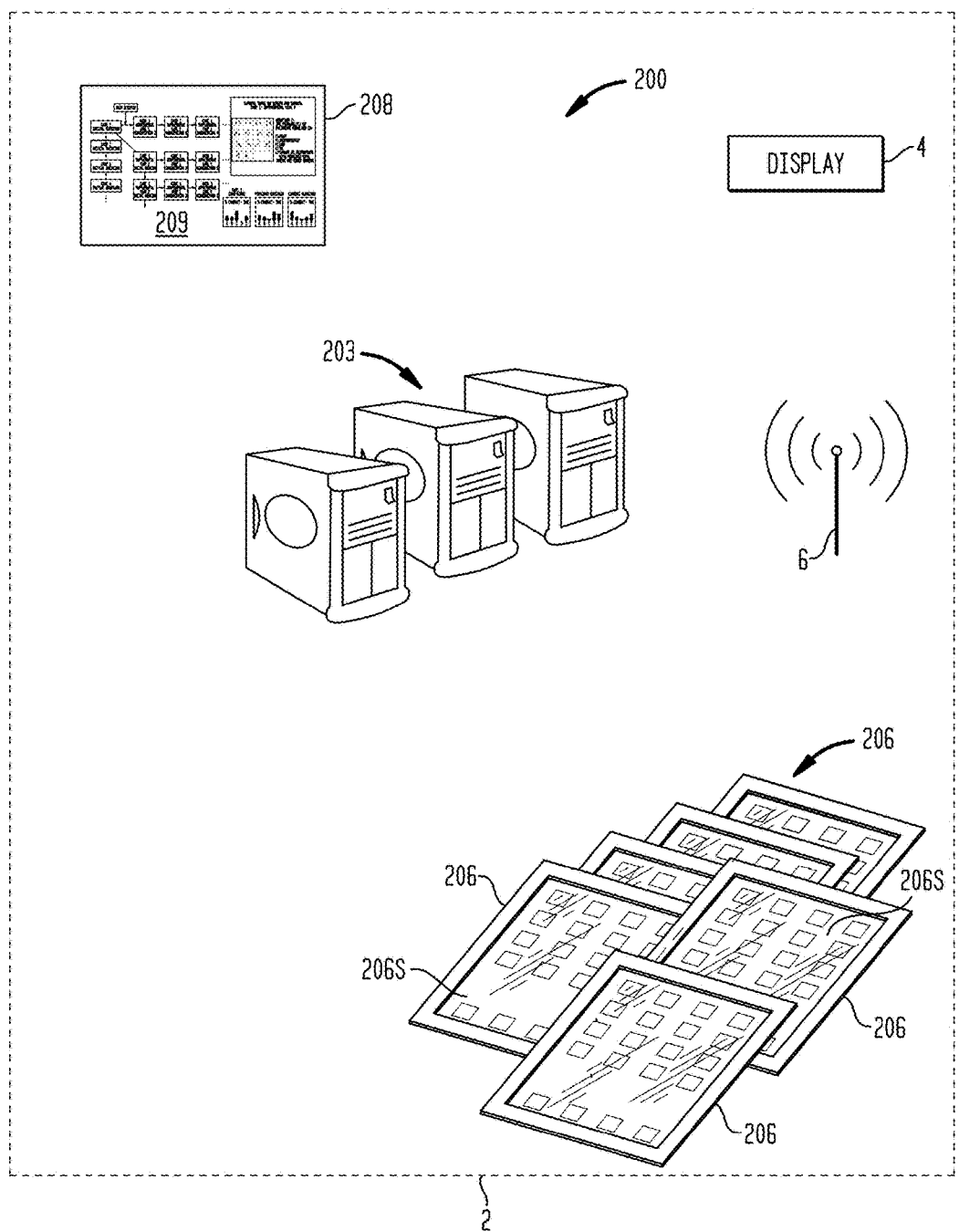
FIG. 1 is a block diagram schematically illustrating a preferred embodiment of the invention.

The following detailed description proceeds using an example in which medical students are attending a radiology lecture. However, it will be understood that the invention is not restricted to students, nor to lectures on medical subjects.

A preferred embodiment of the invention is installed in a lecture hall 2. The lecture hall 2 accommodates a plurality of students (not shown), each of whom has a student response device 206, which may be a portable device with a screen 206S (such as a tablet computer, smartphone, etc.). Advantageously but not necessarily, each of the student response devices 206 is "locked down", i.e. is programmed to prevent a student user from using it otherwise than necessary to operate the herein-described preferred embodiments of the invention.

A display 4 (which may be e.g. a large monitor) may be provided for displaying visual information to the students, but the screens 206S may be used to carry out this function either in addition to, or instead of, the display 4.

A network 6 connects the student response devices 206 and the display 4 to a computer system 203. Advantageously, the network 6 is a locked-down wireless network that is sufficiently fast to deliver visual information at almost instantaneous rates and is isolated to minimize the likelihood of intrusion or hacking, but it is alternatively possible to use a wired network instead. The computer system 203 may (but need not) contain a plurality of high-speed servers with an active load-balancing system.

A lecturer controller 208 is connected to the computer system 203 via the network 6. The lecturer controller 208 allows the lecturer (not shown) to cause predetermined visual information to be displayed on the display 4 and/or the screens 206S. The lecturer controller 208 also allows questions to be broadcast to the students and allows the lecturer to see the students' answers (see below).

Figure 2:
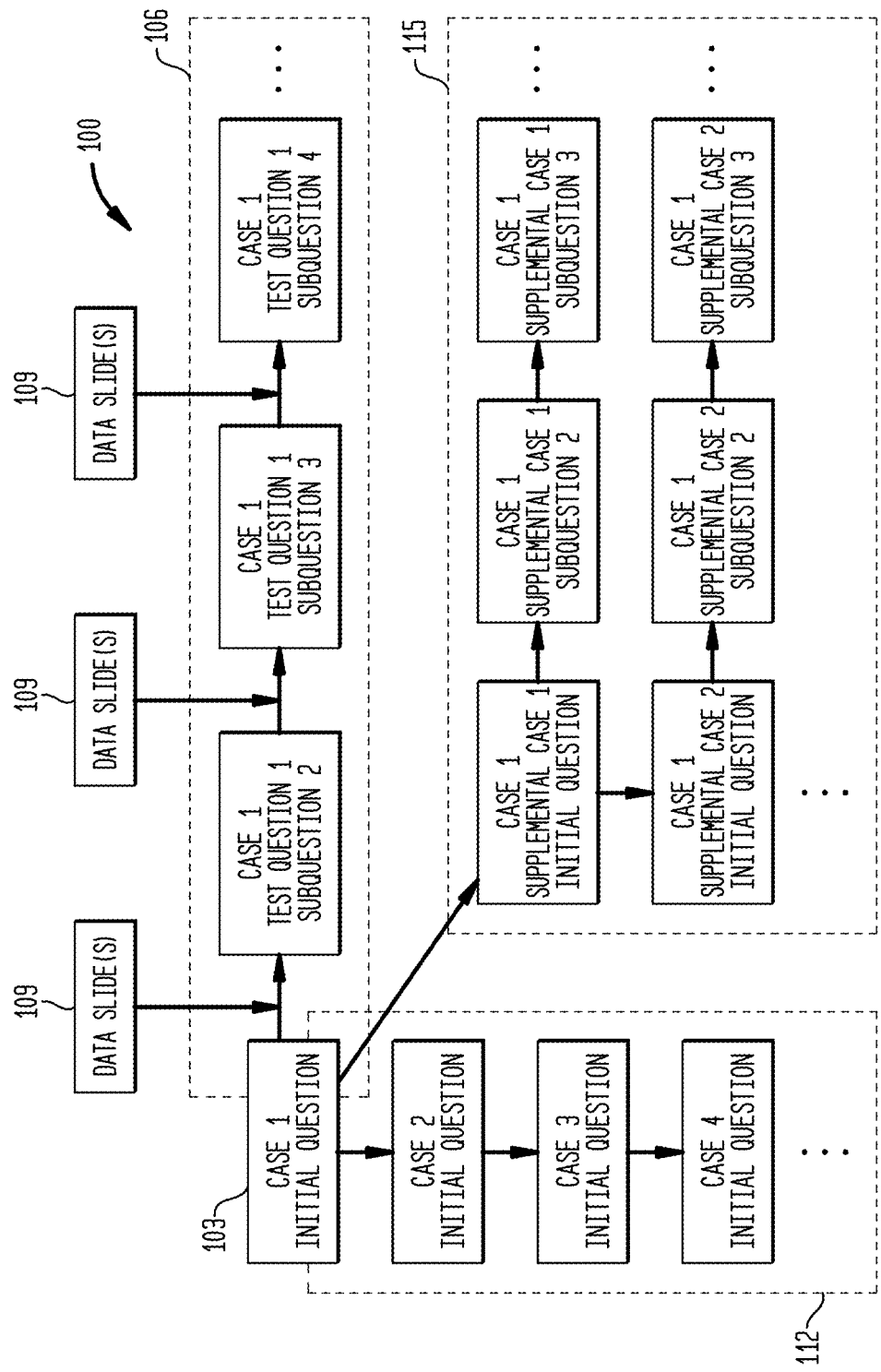
FIG. 2 schematically illustrates how visual information and questions for broadcast to a class can be organized for use with the preferred embodiment of the invention.

When the lecturer prepares a lecture, the preparation will include preparation of visual information for display to the students on the display 4 and/or the screens 206S. In FIG. 2, such information is shown to be in the form of data slides 109, but the information need not be in the form of a slide (as that term is used in e.g. a PowerPoint presentation). The visual information may alternatively be in the form of a video, an animation, or any other information that can be displayed visually (with or without accompanying audio).

The lecturer will also include questions (e.g. question 103, the questions shown in box 106, the questions shown in box 112) in the preparation. In many instances, the questions will be in the form of visual information but this is not required; the questions could for example be broadcast in the form of texts. Advantageously but not necessarily, the organization and sequence of the data slides 109 and the questions (e.g. question 103, the questions shown in box 106, the questions shown in box 112) can be represented by a tree diagram 100 such as is shown in FIG. 2.

While the lecturer delivers a lecture, visual information (slides 109 and questions such as 103 etc.) will be presented to the class via the display 4 and/or the screens 206S. At appropriate points, the lecturer will cause questions (e.g. question 103) to be broadcast to the students, usually in the form of visual information displayed on the display 4 and/or the screens 206S. If the students' answers indicate that the class understands the material that has been presented, more advanced data slides 109 will then be presented to the class. FIG. 2 shows this as moving horizontally to the right, as along a trunk of a tree.

If the students' answers indicate that the class has a superior understanding of the lecture, the lecturer may skip visual information that would ordinarily be displayed. On FIG. 2, this would correspond to an oblique downward and rightward movement (denoted in dashed block 115), as towards the tip of a smaller branch of a tree. However, if the students' answers indicate that the class does not understand the lecture, the lecturer may proceed to a supplemental question or to supplemental data slides, with the objective of bringing the class to an understanding of the material that was not understood before. On FIG. 2, this would correspond to an oblique leftward and upward movement, as toward the trunk end of a larger branch of a tree. This process can be continued as required. As long as the class understands the lecture, the lecture will proceed linearly and the sequence of the visual information displayed will correspond to a horizontal rightward motion along the tree structure 100 (i.e. will proceed sequentially as a conventionally-presented lecture does). However, if the class ceases to understand this material, the lecturer will branch as necessary to visual information and questions that are designed to remedy this, so that the sequence of the visual information displayed will correspond to an oblique upward and leftward motion along the tree structure 100. (In a conventionally-presented lecture, the lecturer's only option would be to go back to visual information that had been previously presented.) Once the students' answers to the questions indicate that the class understands the material in the lecture, the lecturer can present more advanced material (and more advanced questions), corresponding either to a rightward motion, to a downward motion, or to a motion that is both downward and rightward along the tree structure.

Figure 3:
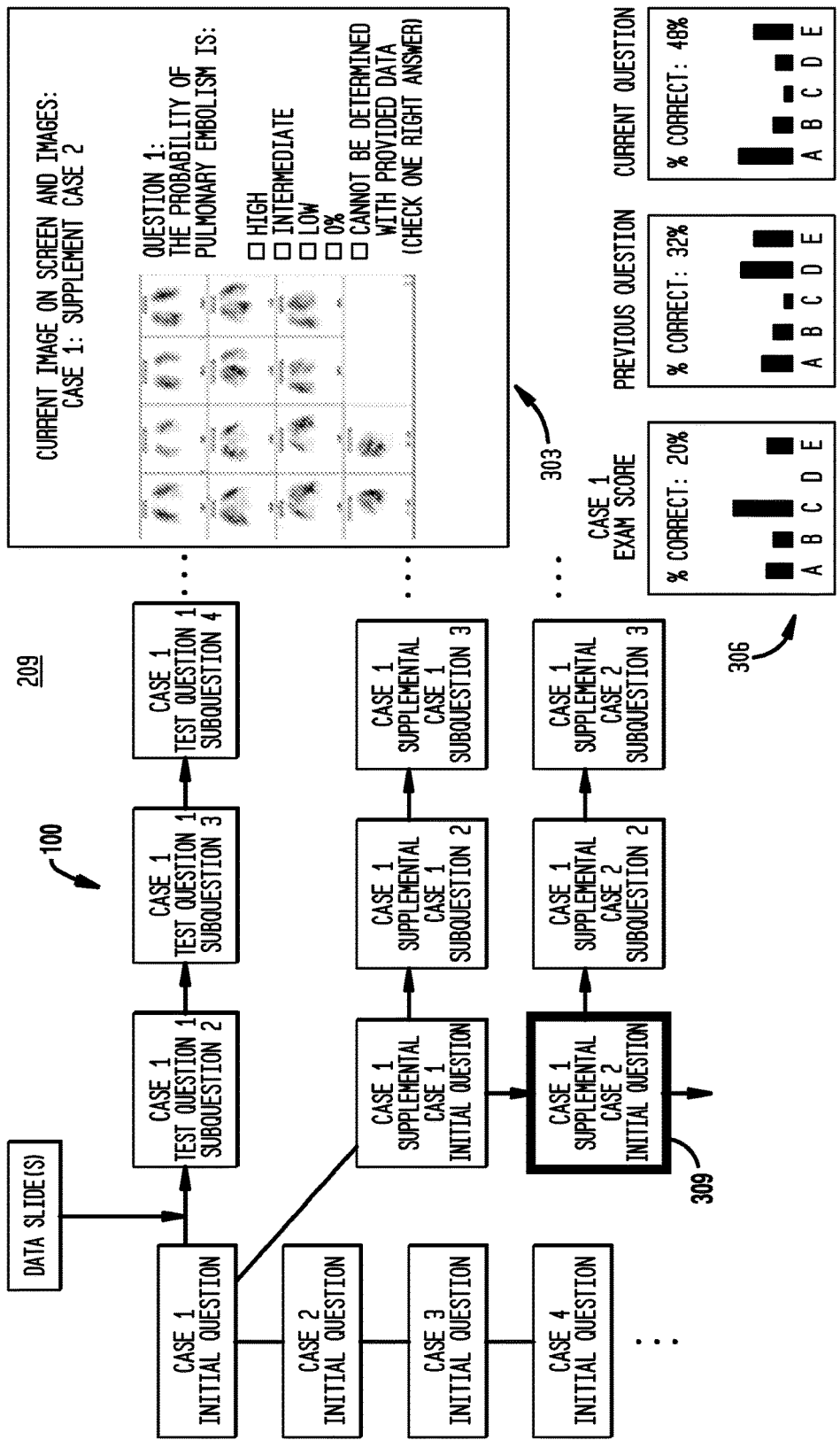
FIG. 3 schematically illustrates the display of a lecturer controller suitable for use in the preferred embodiment of the invention.

Advantageously but not necessarily, the lecturer controller has a touch screen 209. As shown in FIG. 3, the touch screen 209 advantageously displays the tree structure 100 with the currently-displayed visual information (in this example, this is a question 303) highlighted (see icon 309), the currently-broadcast question (in this example, question 303), and the answer history 306 of the class's answers in the currently-presented lecture. This enables the lecturer to decide whether the class is ready to proceed to more advanced subject matter or whether the class must remain at the existing level. Once the lecturer has made this decision, he or she will touch the appropriate icon on the tree structure 100 to cause that visual information to be displayed on the display 4 and/or the screens 206S.

As stated above, it is possible for the lecturer to always begin the lecture at a particular starting point and to vary the lecture after that point in accordance with the students' answers to questions broadcast during the lecture. However, it is alternatively possible for the lecturer to prepare a more comprehensive tree structure 100 and to begin the lecture at a point that is determined by pre-lecture testing of the students.

Figure 4:
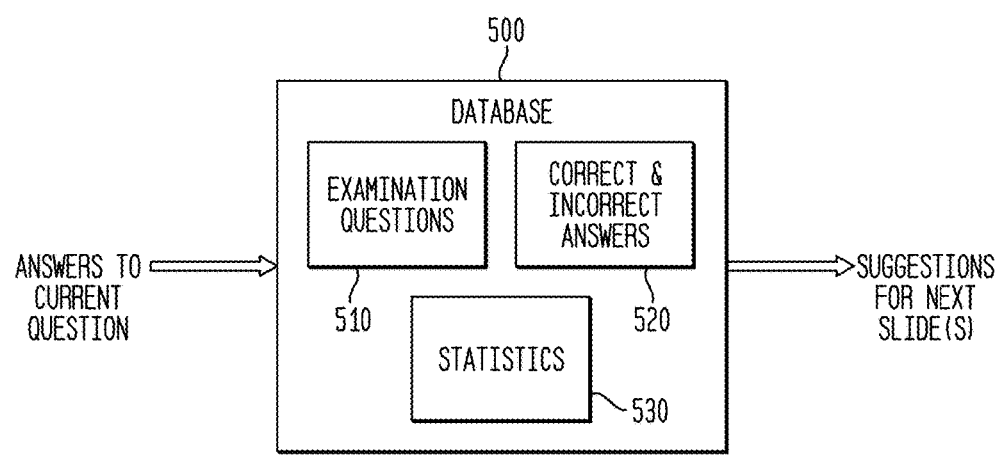
FIG. 4 schematically illustrates a database used in a preferred embodiment of the invention.

Advantageously but not necessarily, a database 500 (see FIG. 4) can reside on the computer system 203. The database 500 is used to output one or more recommended next instructional slides for display to the class based upon the class's answers to a currently-broadcast question (and, optionally, upon the class's answers to questions broadcast earlier in the lecture).

For each lecture, the database 500 contains inter alia examination questions 510, correct and incorrect answers 520 to the examination questions 510, and statistics 530 correlating correct and incorrect answers to the examination questions 510 with students' demonstrated understanding of the subject matter. When a lecture is first given, the database 500 will be empty. However, as a particular lecture is given to progressively more students in more classes, the answers given by the students will form patterns. These patterns will in turn identify (with increasing accuracy as the size of the database 500 grows) subject matter that students will likely find troublesome. Thus, after some time, the database 500 will be sufficiently large that the students' answers to a particular question will indicate that certain subject matter should be taught next. Accordingly, the computer system 203 will suggest one or more instructional slides that should next be displayed on the display 4 or on the screens 206S, and will indicate those slides by highlighting the corresponding icons on the touch screen 209.

Although a preferred embodiment has been described above, the scope of the invention is determined only by the following claims:

The invention claimed is:

1. An apparatus comprising:
   a. at least one display comprising at least one display screen for displaying visual information;
   b. a computer system connected to the at least one display, the computer system being programmed to supply the visual information for a current lecture to the at least one display and comprising a database comprising an adaptable organizational sequence of a plurality of data slides representative of lecture information of the subject matter arranged to advance a knowledge level of the subject matter and a plurality of alternate supplemental data slides corresponding to supplemental information for an existing knowledge level, examination questions associated with the plurality of data slides, for testing in real time understanding of the subject matter during the lecture, correct and incorrect answers to the examination questions, statistics correlating the correct and incorrect answers to the examination questions with understanding of lecture subject matter, and answers to questions of past classes for the lecture, given by attendees of the past classes which forms patterns;
   c. a computer network operatively connected to the computer system;
   d. a plurality of response computing devices connectable to the computer network, each response computing device comprising a display screen and:
      i. being associated with a corresponding one user in such a manner that the plurality of response computing devices and the users are in one-to-one correspondence, and
      ii. being operative to receive an examination question during the current lecture for current visual information via the computer system and the computer network, display the examination question on the display screen of said each response computing device for the current visual information and to send an answer related to the received examination question for the current visual information via the computer network; and
   e. a lecturer controller including a screen and being connected to the computer network, the lecturer controller being operative to:
      i. cause, during the current lecture, the computer system to supply the current visual information associated with the subject matter arranged in the adaptable organizational sequence to the at least one display,
      ii. broadcast, during the current lecture, the examination question associated with the current visual information to the plurality of response computing devices via the computer network,
      iii. receive, during the current lecture, the answer to the examination question from said each of the plurality of response computing devices via the computer network,
      iv. display, during the current lecture, the examination question broadcasted, a class answer history of the answers, from the plurality of response computing devices of a current class, associated with a subset of previously displayed data slides, and a tree structure of currently-available next choices for next visual information of the lecture that can be displayed to the current class, wherein the tree structure being configured to selectively advance in one of: a first direction of movement of a first tree branch, corresponding to a first degree of understanding, through one or more next currently-available data slides of the plurality of data slides; and a second direction of movement of a second tree branch, corresponding to a second degree of understanding, through one or more next currently-available alternate supplemental data slides of the plurality of alternate supplemental data slides, in response to an input selection of a respective one currently-available choice displayed on the screen of the lecture controller, and
      v. adapt, in real time as the lecture continues, the adaptable organizational sequence of the currently-available next choices for the next visual information displayed on the at least one display screen from the computer system in response to the input selection associated with the displayed second set of tree-structure,
   wherein the computer system being configured to suggest next content from the currently-available next choices for the next visual information in one of the first tree branch and the second tree branch that should be displayed on the at least one display screen by highlighting the suggested next content on the screen of the lecturer controller; and wherein, responsive to the input selection of the suggested next content, the organizational sequence is adapted for the next visual information to display on the at least one display screen; and
   (i) wherein the computer system being configured to suggest the next content from the currently-available next choices for the next visual information that should be displayed on the at least one display screen based on percentages of correct answers of the class answer history for the current lecture from which to selectively alter the organizational sequence of the lecture in real time as the lecture continues; (ii) wherein the computer system being configured to suggest the next content from the currently-available next choices for the next visual information that should be displayed on the at least one display screen based on a pattern of answers for the current lecture in relation to a pattern of answers of the past attendees of the past lecture from which to secretively alter the organizational sequence of the lecture in real time as the lecture continues; or (iii) wherein the computer system being configured to suggest the next content from the currently-available next choices for the next visual information that should be displayed on the at least one display screen based on the statistics correlating the correct and incorrect answers from which to selectively alter the organizational sequence of the lecture in real time as the lecture continues; or a combination of any of (i), (ii) and (iii).

2. The apparatus of claim 1, wherein the users are students, and the at least one display, the computer system, the computer network, the plurality of response computing devices, and the lecturer controller are all adapted for use in a classroom.

3. The apparatus of claim 1, wherein said each response computing devices is a portable device.

4. The apparatus of claim 1, wherein the computer network is a wireless network and said each response computing devices is connectable thereto.

5. The apparatus of claim 1, wherein the suggested next content of the next visual information includes a suggested choice for the next visual information representative of content to bring the users to an understanding of the subject matter that was not understood.

6. The apparatus of claim 5, wherein the tree structure comprises at least one examination question configured for selection from the screen of the lecturer controller; and
the at least one examination question comprising at least one image and a text-based question associated with a medical case.

7. An apparatus comprising:
a computer system including subject matter of a lecture and a database, the database comprising:
an adaptable organizational sequence of a plurality of data slides representative of lecture information of the subject matter arranged to advance a knowledge level of the subject matter and a plurality of alternate supplemental data slides corresponding to supplemental information for an exiting knowledge level;
examination questions, associated with the plurality of data slides, for testing in real time understanding of the subject matter during the lecture,
correct and incorrect answers to the examination questions,
statistics correlating the correct and incorrect answers to the examination questions based on a demonstrated understanding of the subject matter, and
answers to questions of past classes for the lecture, given by attendees of the past classes which forms patterns; and
a lecturer controller configured to connect to the computer system and comprising a screen, the lecturer controller being operative to:
cause the computer system to supply visual information in the adaptable organizational sequence to a display screen connected to the computer system,
broadcast at least one current question of the examination questions, based on current visual information, to response computing devices for current class attendees via the computer system,
receive answers to the at least one current question from each of the response computing devices of the current class attendees via the computer system,
display the at least one current question broadcasted, a class answer history of the answers from the current class attendees associated with a subset of previously displayed data slides, and a tree structure of currently-available next choices for next visual information of the lecture that can be displayed to the current class attendees, wherein the tree structure being configured to selectively advance in one of: a first direction of movement of a first tree branch, corresponding to a first degree of understanding, through one or more next currently-available data slides of the plurality of data slides; and a second direction of movement of a second tree branch, corresponding to a second degree of understanding, through one or more next currently-available alternate supplemental data slides of the plurality of alternate supplemental data slides, in response to an input selection of a respective one currently-available choice displayed on said screen of the lecturer controller, and
alter, in real time as the lecture continues, the adaptable organizational sequence of the visual information to be displayed on said display screen under the control of the computer system, in response to the input selection associated with the displayed second set of tree-structure branches,
wherein the computer system being configured to suggest next content from the currently-available next choices of the next visual information in one of the first tree branch and the second tree branch that should be displayed on said display screen by highlighting the suggested next content on said screen of the lecturer controller; and wherein, responsive to the input selection of the suggested next content, the organizational sequence is altered for the next visual information to display on said display screen in real time; and
(i) wherein the computer system being configured to suggest the next content from the currently-available next choices of next visual information that should be displayed on the at least one display screen based on percentages of received correct answers of the class answer history reflective of the first degree of understanding or the second degree of understanding of the subject matter for the current lecture from which to selectively alter the organizational sequence of the lecture in real time as the lecture continues; (ii) wherein the computer system being configured to suggest the next content from the currently-available next choices of the next visual information that should be displayed on the at least one display screen based on a pattern of answers for the current lecture in relation to a pattern of answers of the past attendees of the past lecture from which to selectively alter the organizational sequence of the lecture in real time as the lecture continues; or (iii) wherein the computer system being configured to suggest the next content from the currently-available choices of the next visual information that should be displayed on the at least one display screen based on the statistics correlating the correct and incorrect answers from which to selectively alter the organizational sequence of the lecture in real time as the lecture continues, or a combination of any of (i), (ii) and (iii).

* * * * *